(12) United States Patent  
Li et al.

(10) Patent No.: US 12,196,710 B1  
(45) Date of Patent: Jan. 14, 2025

(54) DEFECT IDENTIFICATION METHOD, AND ARRAY DETECTION PROBE

(71) Applicant: CHINA UNIVERSITY OF PETROLEUM (East China), Qingdao (CN)

(72) Inventors: Wei Li, Shandong (CN); Xin'an Yuan, Shandong (CN); Xiaokang Yin, Shandong (CN); Jianming Zhao, Shandong (CN); Xiao Li, Shandong (CN); Jianchao Zhao, Shandong (CN); Jianxi Ding, Shandong (CN); Han Wang, Shandong (CN); Qinyu Chen, Shandong (CN); Dong Hu, Shandong (CN); Wenbin Wang, Shandong (CN); Xihe Zhang, Shandong (CN); Xiangyang Wang, Shandong (CN)

(73) Assignee: CHINA UNIVERSITY OF PETROLEUM (EAST CHINA), Shandong (CN)

( * ) Notice: Subject to any disclaimer, the term of this patent is extended or adjusted under 35 U.S.C. 154(b) by 0 days.

(21) Appl. No.: 18/664,158

(22) Filed: May 14, 2024

(30) Foreign Application Priority Data

Oct. 13, 2023 (CN) .......................... 202311326347.0  
Nov. 10, 2023 (CN) .......................... 202311493253.2

(51) Int. Cl.  
*G01N 27/90* (2021.01)  
*G01N 27/904* (2021.01)

(52) U.S. Cl.  
CPC ....... *G01N 27/9053* (2013.01); *G01N 27/904* (2013.01)

(58) Field of Classification Search  
None  
See application file for complete search history.

(56) References Cited

U.S. PATENT DOCUMENTS

| 4,528,506 A | 7/1985 | Davis et al. |
| 2004/0178790 A1* | 9/2004 | Gifford ................ G01N 27/904 324/242 |

(Continued)

FOREIGN PATENT DOCUMENTS

| CN | 103063737 A | 4/2013 |
| CN | 104777221 A | 7/2015 |

(Continued)

OTHER PUBLICATIONS

Gao Junqi et al.; Alternating current electromagnetic field lift-off effect compensation method suitable for metal surface cracks; Publication Nov. 12, 2021; Univ Harbin Eng; CN113640369A; CPC G01N27/82 (CN) (Year: 2021).*

(Continued)

*Primary Examiner* — Nasima Monsur  
(74) *Attorney, Agent, or Firm* — The Sun IP Law (57) ABSTRACT

Provided are an alternating current field based defect identification method and an array detection probe. The evaluation method includes the following steps: obtaining a magnetic field Bx signal in direction X and a magnetic field Bz signal in direction Z; removing a background magnetic field of each of the magnetic field Bx signal in the direction X and the magnetic field Bz signal in the direction Z, and obtaining a magnetic field Bx1 signal in the direction X and a magnetic field Bz1 signal in the direction Z without background magnetic fields; drawing an array image of the Bx1 signal and an array image of the Bz1 signal; and locating a distortion zone corresponding to disturbance at the same time and position in the array image of the Bx1 signal and the array image of the Bz1 signal.

2 Claims, 9 Drawing Sheets

(56) References Cited

U.S. PATENT DOCUMENTS

| | | | | |
|---|---|---|---|---|
| 2010/0134099 A1* | 6/2010 | Hyodo | ............... | G01N 27/9053 |
| | | | | 324/239 |
| 2015/0276675 A1* | 10/2015 | Parramore | ......... | G01N 27/9053 |
| | | | | 702/38 |
| 2020/0210826 A1 | 7/2020 | Liu et al. | | |

FOREIGN PATENT DOCUMENTS

| | | |
|---|---|---|
| CN | 110231394 A | 9/2019 |
| CN | 110243922 A | 9/2019 |
| CN | 111189906 A | 5/2020 |
| CN | 111398409 A | 7/2020 |
| CN | 112083059 A | 12/2020 |
| CN | 113671018 A | 11/2021 |
| CN | 113866259 A | 12/2021 |
| CN | 116337990 A | 6/2023 |
| WO | 2012165296 A1 | 12/2012 |

OTHER PUBLICATIONS

Yu, Fengyun et al. "The study of the effect of placement direction and lift-off on the magnetic memory testing signals". Machinery Design & Manufacture. May 28, 2006 (May 28, 2006).

Li, Tianbo et al. "Simulation and experiment of pulsed eddy current array detection system". Nov. 15, 2013 (Nov. 15, 2013).

Zheng, Linghui et al. "Research on Surface Crack Identification and Size Inversion Algorithm Based on ACFM Technology". May 18, 2020 (May 18, 2020).

Zhao, Jianchao et al. "A Surface Crack Assessment Method Unaffected by Lift-Off Based on ACFM". IEEE Sensors Journal. vol. 22, No. 22, Nov. 15, 2022 (Nov. 15, 2022).

\* cited by examiner

DEFECT IDENTIFICATION METHOD, AND ARRAY DETECTION PROBE

CROSS-REFERENCE TO RELATED APPLICATION

The present disclosure claims priority of Chinese Patent Application No. 202311493253.2, filed to the China National Intellectual Property Administration on Nov. 10, 2023 and entitled "an alternating current field based quantitative evaluation method for metal surface cracks", and Chinese Patent Application No. 202311326347.0, filed on Oct. 13, 2023 and entitled "an alternating current field based defect identification method and an array detection probe", the disclosures of which are hereby incorporated by reference in their entirety.

TECHNICAL FIELD

The disclosure belongs to the technical field of nondestructive testing of petroleum pipelines, and particularly relates to an alternating current field based quantitative evaluation method for metal surface cracks. In addition, the disclosure further belongs to the technical field of electromagnetic nondestructive testing, and particularly relates to an alternating current field based defect identification method and an array detection probe.

BACKGROUND

Existing petroleum and petrochemical apparatuses, such as an oil pipeline and a pressure vessel, are susceptible to corrosion, stress, high temperature and other factors for a long time during service, so their structural surfaces are prone to crack defects. These defects influence normal operation of the apparatuses. When a crack expands to a certain extent, structural failure may be further caused, which will cause major safety accidents. Therefore, for safety guarantee of petroleum transportation, it is of great significance to detect a crack of an oil pipeline, a pressure vessel and other apparatuses in time and accurately evaluate its size (so as to determine a maintenance decision). An alternating current field measurement (ACFM) technology is a non-contact nondestructive testing technology for oil pipelines. The technology has advantages of non-contact measurement and accurate mathematical models, so it can quantitatively detect a crack on a surface of a structure under a coating. Its detection principle is that a probe excites induced current on a surface of a workpiece to be tested; and when the induced current encounters a defect, it is disturbed, which leads to distortion of a spatial magnetic field above the crack. A distorted magnetic field signal is picked by a magnetic field sensor in the probe. Cracks on petroleum and petrochemical apparatuses such as an oil pipeline and a pressure vessel can be detected and evaluated through collection, processing and analysis of detection software. An ACFM in equipment testing faces two major challenges: (1) inaccurate quantification of defects caused by constant lift-off under non-metallic coatings, and (2) interference noise caused by improper operation or uneven surfaces, leading to false judgment or missed detection of defects.

However, after further studies, the inventor has found that an existing technology generally coats a surface of a structure with a certain thickness of nonmetallic coating for prolongation of service life of the structure. The induced current cannot directly penetrate the nonmetallic coating so as to reach a surface of a metal structure, such that an electromagnetic field response signal caused by the crack is continuously attenuated (which is equivalent to increase in lift-off height of the probe). This situation will eventually lead to decline of accuracy of quantitative evaluation of the crack. In addition, nonmetallic coatings on surfaces of different structures have different thicknesses. Accordingly, an equivalent lift-off height of the probe is not fixed, which brings great challenges to quantitative evaluation of the crack on the surface of the structure under the nonmetallic coating.

It should be noted that the existing technologies mostly evaluate crack defects under constant lift-off. When a lift-off height changes, it generally needs to be calibrated repeatedly through alternating current field measurement (for instance, Bx is used to denote a crack depth and Bz is used to denote a crack length) or defect databases under different lift-off heights are created. However, the inventor has found that a size of a defect under a nonmetallic coating or an attachment involves various parameters such as length and depth, and a Bx signal distortion magnitude related to depth change and Bz variable quantity related to length change are both related to coating thickness. In consequence, the entire calibration work becomes more complicated. Combinations of length, depth and other parameters are numerous, which will inevitably lead to large errors in calibration results. Moreover, a thickness of a nonmetallic coating is unknown in most cases, which makes it impossible to estimate a lift-off height of a probe. In this case, existing methods for creating calibration or databases is no longer applicable.

Therefore, it is urgent for those skilled in the art to propose an evaluation algorithm for automatically computing a lift-off height. On one hand, the algorithm is used to obtain a thickness of a nonmetallic coating. On the other hand, the algorithm is used to obtain an attenuation coefficient of a signal distortion magnitude related to a defect size. Finally, it is used to accurately evaluate a crack under the nonmetallic coating under arbitrary lift-off.

In addition, petroleum and petrochemical apparatuses, such as an oil pipeline and a pressure vessel, are susceptible to corrosion, stress, high temperature and other effects for a long time during service, so their structural surfaces are prone to crack defects. These defects influence normal operation of the apparatuses. When a crack expands to a certain extent, structural failure may be further caused, which will cause major safety accidents. Therefore, timely and effective crack detection is important for decision-making maintenance and safe operation of apparatuses, an ACFM technology is a non-contact electromagnetic nondestructive testing technology. It does not need to clean a coating or an attachment on a surface of a structure before detection, such that cracks on the surface and near the surface of the structure can be quickly detected under complex working conditions. Therefore, the technology has been successfully applied to oil pipelines, offshore platforms, rail transit, and other fields.

However, after further studies, the inventor has found that in an actual detection process, if a detector improperly operates a probe or a probe cannot maintain constant lift-off in a scanning process because a surface of a workpiece to be tested is uneven, a certain lift-off jitter signal may be eventually caused in a detection signal. It is worth noting that distortion features of the lift-off jitter signal are very similar to those caused by the defect, such that those skilled in the art can hardly eliminate the lift-off jitter signal, and thus cannot accurately identify the defect under lift-off jitter, which may easily lead to missed detection or misjudgment of the defect. In addition, when an existing single alternating current field probe finds an obvious distortion zone in an obtained one-dimensional feature signal, it generally needs to scan the distortion zone repeatedly, so as to eliminate an interference signal caused by non-defects. This situation can increase detection cost and time cost, and reduce detection efficiency.

SUMMARY

The disclosure provides an alternating current field based quantitative evaluation method for metal surface cracks. The evaluation method compensates for a magnetic field signal under arbitrary lift-off through an attenuation coefficient, and deduces and estimates surface cracks of a structure under a nonmetallic coating under arbitrary lift-off according to a quantitative relation between a crack size and a magnetic field signal under fixed lift-off. An evaluation result is accurate and reliable, such that a technical problem that quantitative evaluation accuracy of cracks is reduced because a coating containing nonmetal is applied to a surface of a structure in the prior art is effectively solved. In addition, the disclosure further provides a defect identification method and an array detection probe, which are based on an alternating current field. The solution provides an intuitive and visual identification method of lift-off jitter of an image, such that a defect on a surface of a structure can be accurately detected under lift-off jitter.

To solve the technical problem, the disclosure uses the following technical solution:

An alternating current field based quantitative evaluation method for metal surface cracks includes the following steps:

step one: obtaining a relation between a crack length L, a crack depth D and a Bz peak-valley distance $P_{Bz}$ under fixed lift-off $T_0$, and obtaining a fitting relation between the crack length L and the Bz peak-valley distance $P_{Bz}$ through fitting;

step two: separately extracting a Bx background magnetic field $Bx_0^{T_0}$ under the fixed lift-off $T_0$ and a Bx background magnetic field $Bx_0^T$ under arbitrary lift-off T; and normalizing the Bx background magnetic field $Bx_0^T$ under the arbitrary lift-off T, and obtaining a fitting relation between the normalized Bx background magnetic field $NBx_0^T$ under the arbitrary lift-off T and the Bx background magnetic field $Bx_0^{T_0}$ under the fixed lift-off $T_0$;

step three: obtaining a relation between the crack length L, the crack depth D and a Bz distortion magnitude $D_{Bz}^{T_0}$ under the fixed lift-off $T_0$; and normalizing the Bz distortion magnitude $D_{Bz}^{T_0}$ under the fixed lift-off $T_0$, and obtaining a fitting relation between the normalized Bz distortion magnitude $ND_{Bz}^{T_0}$ under the fixed lift-off $T_0$ and the crack length L and the crack depth D under the fixed lift-off $T_0$;

step four: separately obtaining the Bz distortion magnitude $D_{Bz}^{T_0}$ under the fixed lift-off $T_0$ and a Bz distortion magnitude $D_{Bz}^T$ under the arbitrary lift-off T; comparing the Bz distortion magnitude $D_{Bz}^T$ under the arbitrary lift-off T and the Bz distortion magnitude $D_{Bz}^{T_0}$ under the fixed lift-off $T_0$, and obtaining an attenuation coefficient $K=D_{Bz}^T/D_{Bz}^{T_0}$; and obtaining a relation curve between the arbitrary lift-off T and the attenuation coefficient K through fitting;

step five: conducting parallel scanning along a surface of a test piece with an alternating current field probe, and obtaining a Bx' signal and a Bz' signal under unknown lift-off T';

step six: extracting a Bz' peak-valley distance $P_{Bz'}$ of the Bz' signal; and computing a crack length L' corresponding to the Bz' peak-valley distance $P_{Bz'}$ according to the fitting relation, obtained in step one, between the crack length L and the Bz peak-valley distance $P_{Bz}$;

step seven: extracting a Bx' background magnetic field $Bx'_0^T$ of the Bx' signal, and normalizing a Bx' background magnetic field $Bx'_0^T$ under the unknown lift-off T';

computing the unknown lift-off T' according to the fitting relation, obtained in step two, between the normalized Bx background magnetic field $NBx_0^T$ under the arbitrary lift-off T and the Bx background magnetic field $Bx_0^{T_0}$ under the fixed lift-off $T_0$; and determining the attenuation coefficient K' under the unknown lift-off T' according to the relation curve, obtained in step four, between the arbitrary lift-off T and the attenuation coefficient K;

step eight: extracting a Bz' distortion magnitude $D'^T_{Bz}$ of the Bz' signal;

describing a Bz' distortion magnitude $D'^T_{Bz}$ under the unknown lift-off T' as a Bz" distortion magnitude $D''^T_{Bz}$ under the fixed lift-off $T_0$ in an equivalent compensation manner according to the attenuation coefficient K', obtained in step seven, under the unknown lift-off T'; and normalizing the Bz" distortion magnitude $D''^{T_0}_{Bz}$, obtained through equivalent-compensation description, under the fixed lift-off $T_0$, and obtaining the normalized Bz" distortion magnitude $ND''^{T_0}_{Bz}$ under the fixed lift-off $T_0$; and step nine: computing a crack depth D' under the unknown lift-off T' according to the fitting relation, obtained in step three, between the normalized Bz distortion magnitude $ND_{Bz}^{T_0}$ under the fixed lift-off $T_0$ and the crack length L and the crack depth D under the fixed lift-off $T_0$ on the basis of the normalized Bz" distortion magnitude $ND''^{T_0}_{Bz}$ obtained in step eight, under the fixed lift-off $T_0$ and the crack length L', computed in step six, corresponding to the Bz' peak-valley distance $P_{Bz'}$.

In some embodiments, in step two, after the Bx background magnetic field $Bx_0^T$ under the arbitrary lift-off T is normalized, the fitting relation between the normalized Bx background magnetic field $NBx_0^T$ under the arbitrary lift-off T and the Bx background magnetic field $Bx_0^{T_0}$ under the fixed lift-off $T_0$ satisfies:

$$NBx_0^T = (Bx_0^T - Bx_0^{T_0})/Bx_0^{T_0} \times 100\%.$$

In some embodiments, in step three, after the Bz distortion magnitude $D_{Bz}^{T_0}$ under the fixed lift-off $T_0$ is normalized, a relation between the normalized Bz distortion magnitude $ND_{Bz}^{T_0}$ under the fixed lift-off $T_0$ and the Bz distortion magnitude $D_{Bz}^{T_0}$ under the fixed lift-off $T_0$ satisfies:

$$ND_{Bz}^{T_0} = (D_{Bz}^{T_0} - \min(D_{Bz}^{T_0}))/(\max(D_{Bz}^{T_0}) - \min(D_{Bz}^{T_0})).$$

The disclosure provides an alternating current field based quantitative evaluation method for metal surface cracks. The evaluation method includes the following steps: firstly, obtaining a relation between a crack length L, a crack depth D and a Bz peak-valley distance $P_{Bz}$ under fixed lift-off $T_0$, and extracting a Bx background magnetic field $Bx_0^{T_0}$ under the fixed lift-off $T_0$ and a Bx background magnetic field $Bx_0^T$ under arbitrary lift-off T; and obtaining a fitting relation between the normalized Bx background magnetic field $NBx_0^T$ under the arbitrary lift-off T and the Bx background magnetic field $Bx_0^{T_0}$ under the fixed lift-off $T_0$. The above steps are configured to obtain a thickness of the nonmetallic coating, which solve a lift-off height measurement problem caused by a coating having an unknown thickness, and lay a foundation for quantification of the crack length and the crack depth in the following steps. Then, an attenuation coefficient $K=D_{Bz}^T/D_{Bz}^{T_0}$ is obtained, and a relation curve between the arbitrary lift-off T and the attenuation coefficient K is obtained through fitting. Preliminary studies find that the attenuation coefficient K is unrelated with the crack depth and only related with a lift-off height, such that signal attenuation degrees of cracks having different sizes under different lift-off heights can be analyzed through the attenuation coefficient K. Then, parallel scanning is conducted along a surface of a test piece with an alternating current field probe, and a Bx' signal and a Bz' signal under unknown lift-off T' are obtained. A Bz' peak-valley distance $P_{Bz'}$ of the Bz' signal is extracted, and a corresponding crack length L' is inversely computed according to a fitting formula. A Bx' background magnetic field $Bx'_0{}^{T_0}$ of the Bx' signal is extracted, and the unknown lift-off T' and an attenuation coefficient K' under the unknown lift-off T' are inversely computed according to a fitting formula. A Bz' distortion magnitude $D'_{Bz}{}^T$ of the Bz' signal is extracted. A corresponding crack depth D' is inversely computed according to a fitting formula.

The alternating current field based quantitative evaluation method for metal surface cracks has the above step features, and various data fitting relations under the fixed lift-off $T_0$ and the arbitrary lift-off T are obtained through fitting. Then, a magnetic field signal under the unknown lift-off T' is compensated for through the attenuation coefficient, such that the corresponding crack length L' and the corresponding crack depth D' are inversely computed, and cracks on a surface of a structure under the nonmetallic coating under arbitrary unknown lift-off T' are accurately evaluated. The above specific steps may be summarized as follows: a distortion magnitude of a Bz signal under arbitrary height may be obtained by means of an attenuation coefficient; a crack length and a crack depth may be further evaluated by means of the distortion magnitude of the Bz signal; and arbitrary unknown lift-off is equivalently transformed into a traditional constant lift-off condition, and then the crack depth and the crack length are evaluated by means of a distortion magnitude of a Bx signal and the distortion magnitude of the Bz signal, respectively. Therefore, the alternating current field based quantitative evaluation method for metal surface cracks according to the disclosure improves data computation accuracy, meanwhile simplifies a computation flow, and solves an accurate evaluation problem of cracks under arbitrary lift-off.

In order to solve the technical problem of defect identification under lift-off jitter, the disclosure uses the following technical solution: an alternating current field based defect identification method includes the following steps: step one: enabling an array detection probe to conduct parallel scanning along a surface of a workpiece, and obtaining a magnetic field Bx signal in direction X and a magnetic field Bz signal in direction Z; step two: extracting a background magnetic field at a defect-free position, separately removing a background magnetic field of each of the magnetic field Bx signal in the direction X and the magnetic field Bz signal in the direction Z, and obtaining a magnetic field Bx1 signal in the direction X and a magnetic field Bz1 signal in the direction Z without background magnetic fields;

step three: using a position of the array detection probe as X-axis data, a position of a sensor array as Y-axis data, and an amplitude of a collected magnetic field signal as Z-axis data, and drawing an array image of the Bx1 signal and an array image of the Bz1 signal; and step four: locating a distortion zone corresponding to disturbance at the same time and position in the array image of the Bx1 signal and the array image of the Bz1 signal;

determining whether distortion signals obtained by different sensor units in the distortion zone are all perpendicular to an X axis; and determining that the distortion signals are lift-off signals if the distortion signals are all perpendicular to the X axis, and otherwise, determining that the distortion signals are defect signals.

The disclosure further provides an alternating current field based array detection probe. The array detection probe includes: a probe housing, a lemo connector, a sensor array, an excitation device, and a signal conditioning circuit. The lemo connector is mounted on one side of the probe housing for detection signal transmission. The sensor array, the excitation device and the signal conditioning circuit are all mounted in the probe housing.

The excitation device includes an excitation coil and a U-shaped magnetic core, and the excitation coil is uniformly wound around the U-shaped magnetic core and is configured to generate a uniform induced electromagnetic field on a surface of a workpiece to be tested. The sensor array is mounted directly below the excitation device, and includes n groups of sensor units, where n≥3. The sensor units are arranged between two legs on a lower portion of the U-shaped magnetic core, and are uniformly and equidistantly arranged in a cross beam direction of the U-shaped magnetic core. Each group of sensor units consists of a tunnel magnetoresistance (TMR) magnetic sensor having an X-axis sensitive direction and a TMR magnetic sensor having a Z-axis sensitive direction. The signal conditioning circuit is mounted above the excitation device and configured to amplify and filter a signal output by the sensor array.

In some embodiments, the array detection probe further includes: a probe gland configured to seal the probe housing.

The probe gland and the probe housing are fixedly connected into an integrated structure by means of a fixing screw.

The disclosure provides a defect identification method and an array detection probe, which are based on an alternating current field. The defect identification method includes the following steps: obtaining a magnetic field Bx signal in direction X and a magnetic field Bz signal in direction Z; removing a background magnetic field of each of the magnetic field Bx signal in the direction X and the magnetic field Bz signal in the direction Z, and obtaining a magnetic field Bx1 signal in the direction X and a magnetic field Bz1 signal in the direction Z without background magnetic fields; drawing an array image of the Bx1 signal and an array image of the Bz1 signal; and locating a distortion zone corresponding to disturbance at the same time and position in the array image of the Bx1 signal and the array image of the Bz1 signal. The alternating current field based defect identification method and array detection probe have above structural features, the obtained detection results are specifically verified by means of different sensor units, such that accuracy and detection efficiency of the detection results are significantly improved. Meanwhile, the magnetic field Bx signal in the direction X and the magnetic field Bz signal in the direction Z are obtained on the basis of the array detection probe. After interference of the background magnetic field of each signal is removed, jitter lift-off defect disturbance is accurately identified according to distortion signals obtained by different sensor units. In this way, an interference signal caused by non-defects is eliminated, and finally accuracy of the detection results is improved.

BRIEF DESCRIPTION OF THE DRAWINGS

The accompanying drawings, which are used to provide further understanding of the disclosure and constitute a part of the description, together with examples of the disclosure, serve to explain the disclosure instead of limiting the disclosure. In the accompanying drawings.

REFERENCE NUMBERS 10, probe housing; 101, side housing wall; 102, prismoid; 103, rectangular recess; 104, threaded hole; 105, mounting hole; 20, lemo connector; 30, sensor array; 301, sensor unit; 3011, TMR magnetic sensor having an X-axis sensitive direction; 3012, TMR magnetic sensor having a Z-axis sensitive direction; 40, excitation device; 401, U-shaped magnetic core; 402, excitation coil; 50, signal conditioning circuit; 60, probe gland; 70, fixing screw.

DETAILED DESCRIPTION OF THE EMBODIMENTS

The disclosure provides an alternating current field based quantitative evaluation method for metal surface cracks. The evaluation method compensates for a magnetic field signal under arbitrary lift-off through an attenuation coefficient, and deduces and estimates surface cracks of a structure under a nonmetallic coating under arbitrary lift-off according to a quantitative relation between a crack size and a magnetic field signal under fixed lift-off. An evaluation result is accurate and reliable, such that a technical problem that quantitative evaluation accuracy of cracks is reduced because a coating containing nonmetal is applied to a surface of a structure in the prior art is effectively solved.

Figure 1:
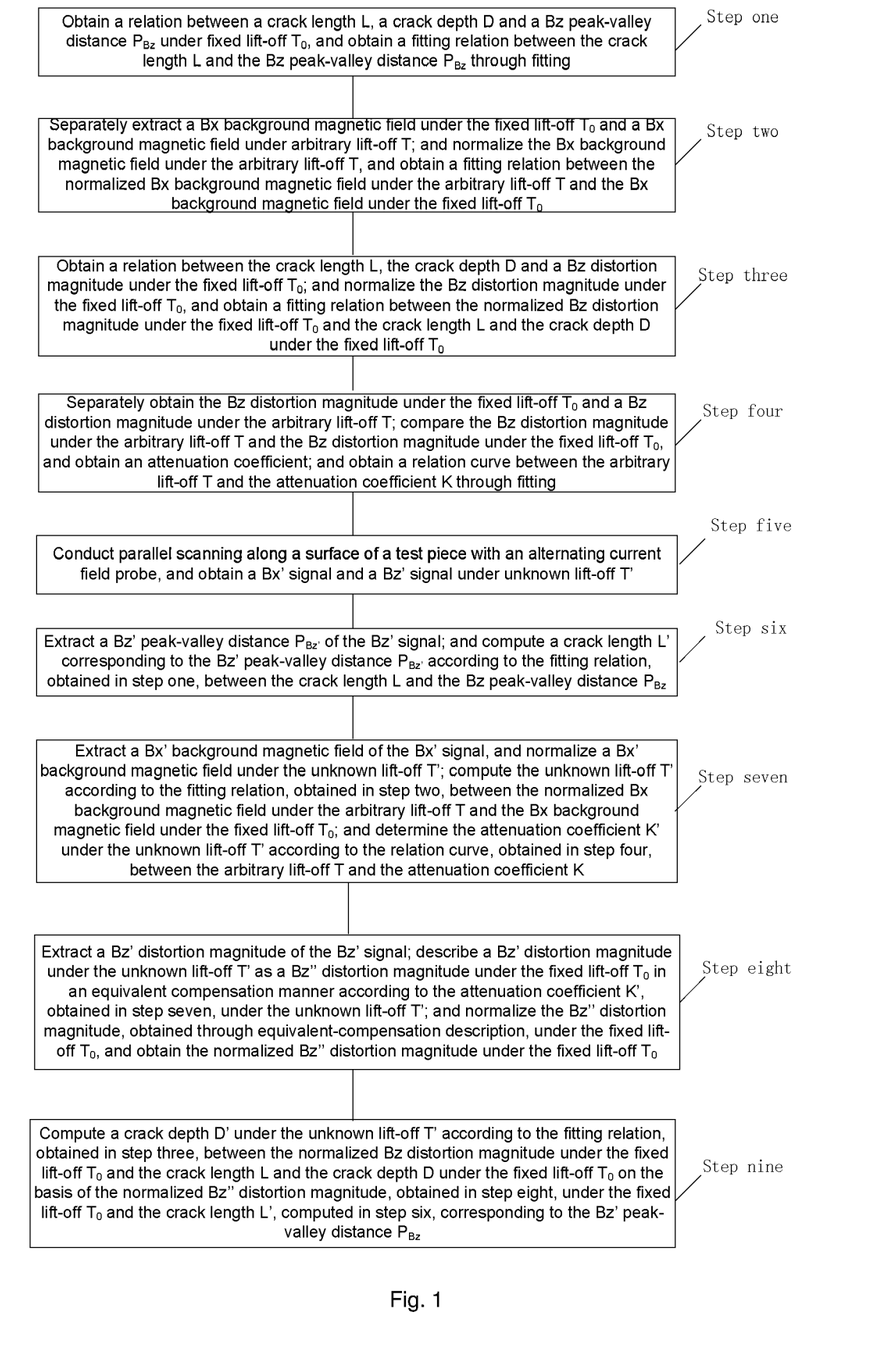
FIG. 1 is a schematic flow diagram of an alternating current field based quantitative evaluation method for metal surface cracks according to the disclosure.

Specifically, the disclosure provides an alternating current field based quantitative evaluation method for metal surface cracks. As shown in FIG. 1, the method includes the following steps:

Step one: a relation between a crack length L, a crack depth D and a Bz peak-valley distance $P_{Bz}$ under fixed lift-off $T_0$ is obtained, and a fitting relation between the crack length L and the Bz peak-valley distance $P_{Bz}$ is obtained through fitting.

Figure 2:
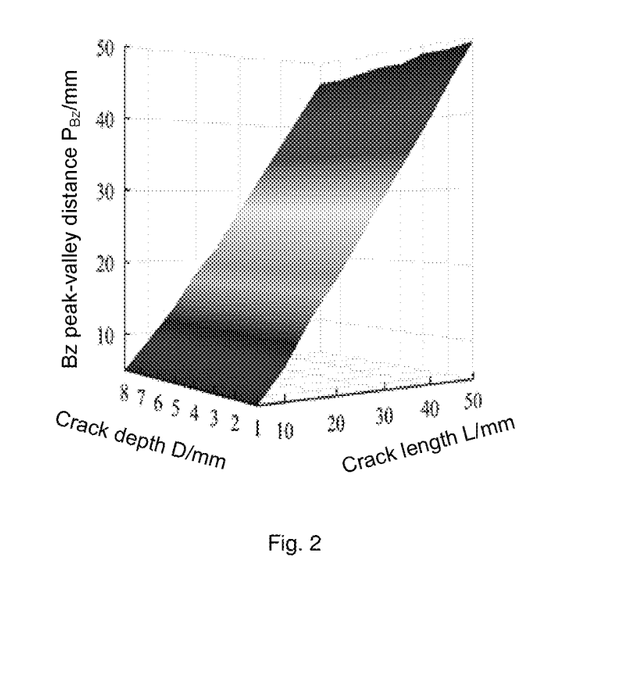
FIG. 2 is a surface plot of a relation between a crack length L, a crack depth D and a Bz peak-valley distance $P_{Bz}$ under fixed lift-off $T_0$.

It should be noted that for illustration of an alternating current field based quantitative evaluation method for metal surface cracks according to the disclosure, specific examples are provided as follows:

Parameters used in simulation are as follows: fixed lift-off $T_0$ is 1 mm, a crack length L is 5 mm-50 mm (an interval is 5 mm), and a crack depth D is 1 mm-8 mm (an interval is 1 mm). Further, the relation between the Bz peak-valley distance $P_{Bz}$, the crack length L and the crack depth D is determined (a relation surface plot is as shown in FIG. 2). As shown in FIG. 2, the fitting relation between the crack length L and the Bz peak-valley distance $P_{Bz}$ may be obtained through fitting. A fitting formula satisfies:

$$L = 1.077 \times P_{Bz} + 0.266.$$

Step two: a Bx background magnetic field $Bx_0^{T_0}$ under the fixed lift-off $T_0$ and a Bx background magnetic field $Bx_0^T$ under arbitrary lift-off T are separately extracted.

The Bx background magnetic field $Bx_0^T$ under the arbitrary lift-off T is normalized, and a fitting relation between the normalized Bx background magnetic field $NBx_0^T$ under the arbitrary lift-off T and the Bx background magnetic field $Bx_0^T$ under the fixed lift-off $T_0$ is obtained.

Figure 3:
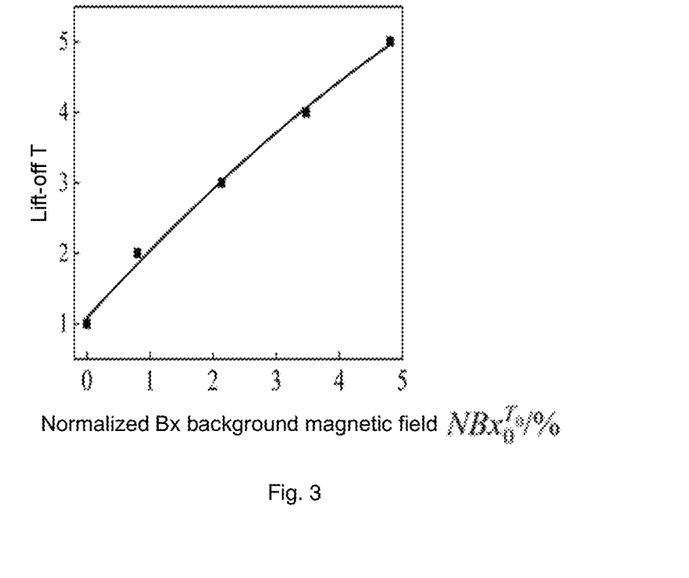
FIG. 3 is a diagram of a relation curve between arbitrary lift-off T and a background magnetic field $NBx_0^T$ normalized from a Bx background magnetic field $Bx_0^T$ under the arbitrary lift-off T.

On the basis of completion of step one, step two is further completed. The arbitrary lift-off T is 1 mm, 2 mm, 3 mm, 4 mm, or 5 mm. Then the Bx background magnetic field $Bx_0^T$ under different arbitrary lift-off T is extracted separately, and the Bx background magnetic field $Bx_0^T$ under the above arbitrary lift-off T is normalized. Then, a relation curve diagram between the arbitrary lift-off T and a background magnetic field $NBx_0^T$ normalized from the Bx background magnetic field $Bx_0^T$ under the arbitrary lift-off T may be drawn. As shown in FIG. 3, a fitting formula between the arbitrary lift-off T and the background magnetic field $NBx_0^T$ normalized from the Bx background magnetic field $Bx_0^T$ under the arbitrary lift-off T satisfies:

$$T = -0.0383 \times NBx_0^{T2} + 0.9905 \times NBx_0^T + 1.0864.$$

As a more preferred embodiment, the fitting relation between the normalized Bx background magnetic field $NBx_0^T$ under the arbitrary lift-off T and the Bx background magnetic field $Bx_0^T$ under the fixed lift-off $T_0$ satisfies: $NBx_0^T = (Bx_0^T - Bx_0^{T_0})/Bx_0^{T_0} \times 100\%$. It should be noted that those skilled in the art may obtain a thickness of a nonmetallic coating according to the Bx background magnetic field $Bx_0^T$ under the arbitrary lift-off T, such that a lift-off height measurement problem caused by a coating having an unknown thickness corresponding to the prior art is solved, which lays a foundation for quantification of the crack length and the crack depth in the following steps.

Step three: a relation between the crack length L, the crack depth D and a Bz distortion magnitude $D_{Bz}^{T_0}$ under the fixed lift-off $T_0$ is obtained.

The Bz distortion magnitude $D_{Bz}^{T_0}$ under the fixed lift-off $T_0$ is normalized, and a fitting relation between the normalized Bz distortion magnitude $ND_{Bz}^{T_0}$ under the fixed lift-off $T_0$ and the crack length L and the crack depth D under the fixed lift-off $T_0$ is obtained.

Figure 4:
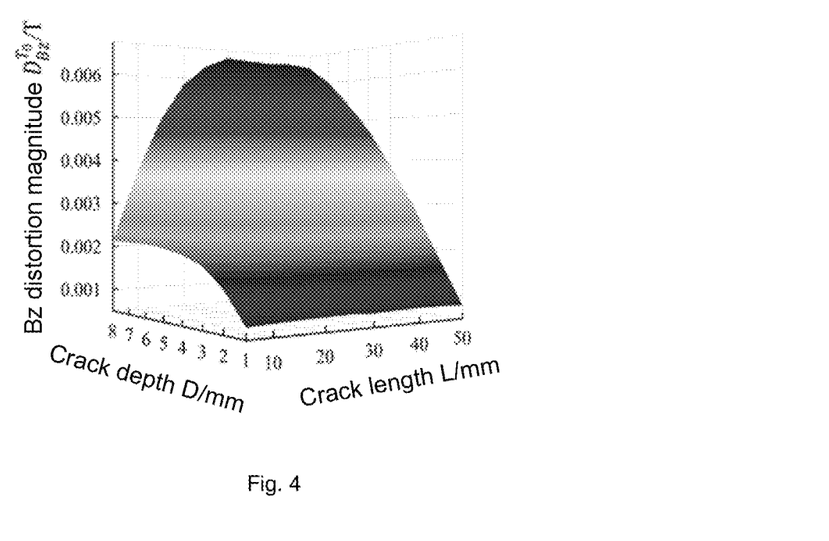
FIG. 4 is a surface plot of a relation between a Bz distortion magnitude $D_{Bz}^{T_0}$ and a crack length L and a crack depth D under fixed lift-off $T_0$.

On the basis of completion of step two, step three is further completed. Specifically, the Bz distortion magnitude $D_{Bz}^{T_0}$ under the fixed lift-off $T_0$ of 1 mm, the crack length L of 5 mm-50 mm (an interval of 5 mm) and the crack depth D of 1 mm-8 mm (an interval of 1 mm) is obtained through simulating computation, such that the relation between the Bz distortion magnitude $D_{Bz}^{T_0}$ and the crack length L and the crack depth D under the fixed lift-off $T_0$ is determined (a relation diagram is drawn). As shown in FIG. 4, a relation between the normalized Bz distortion magnitude $ND_{Bz}^{T_0}$ under the fixed lift-off $T_0$ and the Bz distortion magnitude $D_{Bz}^{T_0}$ under the fixed lift-off $T_0$ according to the preferred example is as follows: $ND_{Bz}^{T_0}=(D_{Bz}^{T_0}-\min(D_{Bz}^{T_0}))/(\max(D_{Bz}^{T_0})-\min(D_{Bz}^{T_0}))$, such that the normalized Bz distortion magnitude $ND_{Bz}^{T_0}$ under the fixed lift-off $T_0$ is obtained, and a fitting formula between the normalized Bz distortion magnitude $ND_{Bz}^{T_0}$, the crack length L and the crack depth D is obtained as follows:

$$ND_{Bz}^{T_0}=-0.2041+0.01447\times L+0.1025\times D-0.008691\times L^2+0.007657\times DL-0.01109\times D^2+1.193^{-5}\times L^3-0.0001092\times L^2D+5.133^{-5}\times D^2L-5.299^{-5}\times D^3.$$

Step four: the Bz distortion magnitude $D_{Bz}^{T_0}$ under the fixed lift-off $T_0$ and a Bz distortion magnitude $D_{Bz}^T$ under the arbitrary lift-off T are separately obtained; the Bz distortion magnitude $D_{Bz}^T$ under the arbitrary lift-off T and the Bz distortion magnitude $D_{Bz}^{T_0}$ under the fixed lift-off $T_0$ are compared, and an attenuation coefficient $K=D_{Bz}^T/D_{Bz}^{T_0}$ is obtained; and a relation curve between the arbitrary lift-off T and the attenuation coefficient K is obtained through fitting.

On the basis of completion of step three, step four is further completed. Specifically, the Bz distortion magnitude $Bx_0^T$ under the fixed lift-off $T_0$ (the fixed lift-off $T_0$ is 1 mm) and the Bz distortion magnitude $Bx_0^T$ under the arbitrary lift-off T (the arbitrary lift-off T is 1 mm, 2 mm, 3 mm, 4 mm, or 5 mm) are separately obtained; and then the Bz distortion magnitude $D_{Bz}^T$ under the arbitrary lift-off T and the Bz distortion magnitude $D_{Bz}^T$ under the fixed lift-off $T_0$ are compared, and the attenuation coefficient $K=D_{Bz}^T/D_{Bz}^{T_0}$ is obtained.

Figure 5:
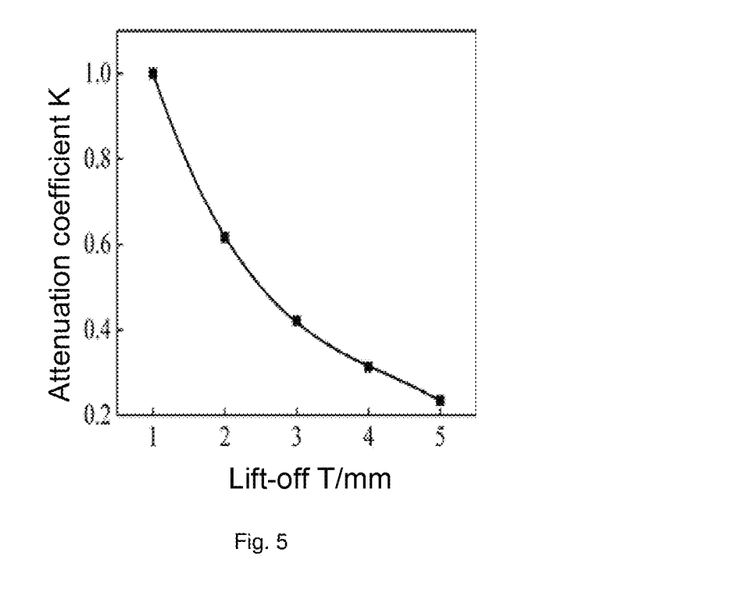
FIG. 5 is a diagram of a relation curve between arbitrary lift-off T and an attenuation coefficient K.

On the basis of the above steps, the relation curve between the arbitrary lift-off T and the attenuation coefficient K is obtained through fitting (a relation curve diagram is as shown in FIG. 5). A fitting formula between the arbitrary lift-off T and the attenuation coefficient K satisfies: $K=-0.0133\times T^3+0.17\times T^2-0.797\times T+1.64$. It should be noted that studies find that the attenuation coefficient K is unrelated with the crack depth and only related with a lift-off height, such that those skilled in the art may obtain signal attenuation degrees of cracks having different sizes under an arbitrary lift-off T height through the attenuation coefficient K.

Step five: parallel scanning is conducted along a surface of a test piece with an alternating current field probe, and a Bx' signal and a Bz' signal under unknown lift-off T' are obtained.

Figure 6:
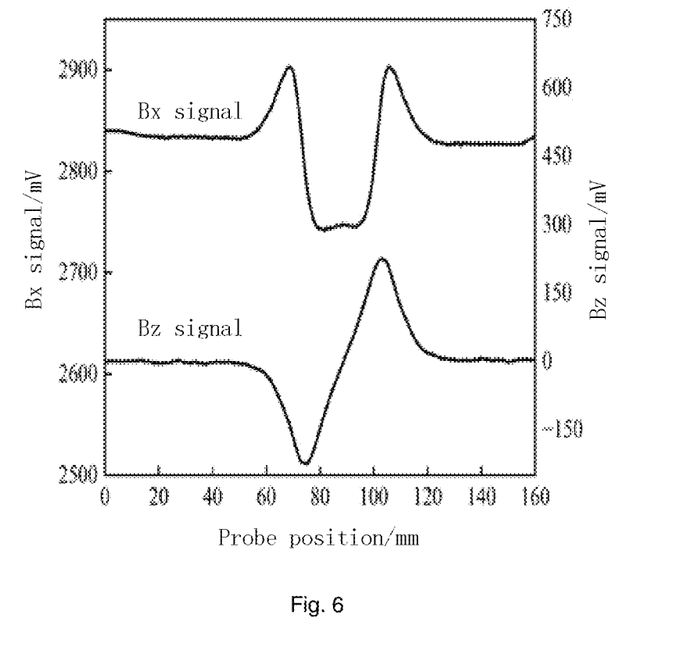
FIG. 6 is a curve diagram of a Bx' signal and a Bz' signal under unknown lift-off T' in an example.

On the basis of completion of step four, step five is further completed. It should be noted that for completion of the subsequent steps, those skilled in the art prepare an aluminum test piece having cracks having a crack length of 30 mm, a crack depth of 5 mm, and a crack width of 0.5 mm, and make a 3 mm thick acrylic plate and place the plate on a surface of the aluminum test piece, so as to simulate 3 mm lift-off; and then parallel scanning is conducted along a surface of the test piece having the acrylic plate with the alternating current field probe, such that the Bx' signal and the Bz' signal under the unknown lift-off T' are obtained, where a signal form is shown in FIG. 6.

Step six: a Bz' peak-valley distance $P_{Bz'}$ of the Bz' signal is extracted; and a crack length L' corresponding to the Bz' peak-valley distance $P_{Bz'}$ is computed according to the fitting relation, obtained in step one, between the crack length L and the Bz peak-valley distance $P_{Bz}$.

After experiment, the Bz' peak-valley distance $P_{Bz'}$ of the Bz' signal is extracted as 28.5 mm, and the crack length L' is computed as 30.96 mm according to the fitting relation, obtained in step one, between the crack length L and the Bz peak-valley distance $P_{Bz}$, which has an error about 3.2% relative to an actual size.

Step seven: a Bx' background magnetic field $Bx_0'^T$ of the Bx' signal is extracted, and a Bx' background magnetic field $Bx_0'^T$ under the unknown lift-off T' is normalized;

the unknown lift-off T' is computed according to the fitting relation, obtained in step two, between the normalized Bx background magnetic field $NBx_0^T$ under the arbitrary lift-off T and the Bx background magnetic field $Bx_0^{T_0}$ under the fixed lift-off $T_0$; and the attenuation coefficient K' under the unknown lift-off T' is determined according to the relation curve, obtained in step four, between the arbitrary lift-off T and the attenuation coefficient K.

Then, the Bx' background magnetic field $Bx_0'^T$ of the Bx' signal is extracted as 2838 mV, and the Bx' background magnetic field $Bx_0'^T$ under the unknown lift-off T' is normalized. The normalized Bx' background magnetic field $NBx_0'^T$ under the unknown lift-off T' is 2.172. The unknown lift-off T' is computed as 3.057 mm according to the fitting relation, obtained in step two, between the normalized Bx background magnetic field $NBx_0^T$ under the arbitrary lift-off T and the Bx background magnetic field $Bx_0^{T_0}$ under the fixed lift-off $T_0$, which has a relative error of about 1.9%. The attenuation coefficient K' under the unknown lift-off T' is 0.412.

Step eight: a Bz' distortion magnitude $D_{Bz'}'^T$ of the Bz' signal is extracted;

a Bz' distortion magnitude $D_{Bz'}'^T$ under the unknown lift-off T' is described as a Bz" distortion magnitude $D''_{Bz}^{T_0}$ under the fixed lift-off $T_0$ in an equivalent compensation manner according to the attenuation coefficient K', obtained in step seven, under the unknown lift-off T'; and the Bz" distortion magnitude $D''_{Bz}^{T_0}$, obtained through equivalent-compensation description, under the fixed lift-off $T_0$ is normalized, and the normalized Bz" distortion magnitude $ND''_{Bz}{}^{T_0}$ under the fixed lift-off $T_0$ is obtained.

Specifically, the Bz' distortion magnitude $D'_{Bz}{}^T$ of the Bz' signal is extracted as 449 mV. Then, the Bz' distortion magnitude $D'_{Bz}{}^T$ under the unknown lift-off T' is described as the Bz" distortion magnitude $D''_{Bz}{}^{T_0}$ of 1089 mV under the fixed lift-off $T_0$ in an equivalent compensation manner according to the attenuation coefficient K', obtained in step seven, under the unknown lift-off T'. In this case, the normalized Bz" distortion magnitude $ND''_{Bz}{}^{T_0}$ under the fixed lift-off $T_0$ is 0.724.

Step nine: a crack depth D' under the unknown lift-off T' is computed according to the fitting relation, obtained in step three, between the normalized Bz distortion magnitude $ND_{Bz}{}^{T_0}$ under the fixed lift-off $T_0$ and the crack length L and the crack depth D under the fixed lift-off $T_0$ on the basis of the normalized Bz" distortion magnitude $ND''_{Bz}{}^{T_0}$, obtained in step eight, under the fixed lift-off $T_0$ and the crack length L', computed in step six, corresponding to the Bz' peak-valley distance $P_{Bz'}$.

Finally, the normalized Bz" distortion magnitude $ND''_{Bz}{}^{T_0}$ ($ND''_{Bz}{}^{T_0}$ is 0.724), obtained in step eight, under the fixed lift-off $T_0$ and the crack length L' (the crack length L' is 30.96 mm), computed in step six, corresponding to the Bz' peak-valley distance $P_{Bz'}$, are substituted into the fitting relation, obtained in step three, between the normalized Bz distortion magnitude $ND_{Bz}{}^{T_0}$ under the fixed lift-off $T_0$ and the crack length L and the crack depth D under the fixed lift-off $T_0$, such that the crack depth D' under the unknown lift-off T' may be computed as 5.216 mm, which has a relative error of about 4.32%.

In this case, in the alternating current field based quantitative evaluation method for metal surface cracks according to the disclosure, the distortion magnitude of the Bz signal under arbitrary height is obtained by means of the attenuation coefficient; the crack length and the crack depth are further evaluated by means of the distortion magnitude of the Bz signal; and then arbitrary unknown lift-off is equivalently transformed into a traditional constant lift-off condition, and further the crack depth and the crack length are evaluated by means of the distortion magnitude of the Bx signal and the distortion magnitude of the Bz signal, respectively. A computation flow is simplified while evaluation and computation accuracy is improved, which is conducive to solving of an accurate evaluation problem of cracks under the arbitrary lift-off.

The disclosure provides an alternating current field based quantitative evaluation method for metal surface cracks. The evaluation method includes the following steps: firstly, a relation between a crack length L, a crack depth D and a Bz peak-valley distance $P_{Bz}$ under fixed lift-off $T_0$ is obtained, and a Bx background magnetic field ° under the fixed lift-off $T_0$ and a Bx background magnetic field $Bx_0{}^T$ under arbitrary lift-off T are extracted; and a fitting relation between the normalized Bx background magnetic field $NBx_0{}^T$ under the arbitrary lift-off T and the Bx background magnetic field $Bx_0{}^{T_0}$ under the fixed lift-off $T_0$ is obtained. The above steps are configured to obtain a thickness of the nonmetallic coating, which solve a lift-off height measurement problem caused by a coating having an unknown thickness, and lay a foundation for quantification of the crack length and the crack depth in the following steps. Then, an attenuation coefficient $K=D_{Bz}{}^T/D_{Bz}{}^{T_0}$ is obtained, and a relation curve between the arbitrary lift-off T and the attenuation coefficient K is obtained through fitting. Preliminary studies find that the attenuation coefficient K is unrelated with the crack depth and only related with a lift-off height, such that signal attenuation degrees of cracks having different sizes under different lift-off heights can be analyzed through the attenuation coefficient K. Then, parallel scanning is conducted along a surface of a test piece with an alternating current field probe, and a Bx' signal and a Bz' signal under unknown lift-off T' are obtained. A Bz' peak-valley distance $P_{Bz'}$ of the Bz' signal is extracted, and a corresponding crack length L' is inversely computed according to a fitting formula. A Bx' background magnetic field $Bx'_0{}^T$ of the Bx' signal is extracted, and the unknown lift-off T' and an attenuation coefficient K' under the unknown lift-off T' are inversely computed according to a fitting formula. A Bz' distortion magnitude $D'_{Bz}{}^T$ of the Bz' signal is extracted. A corresponding crack depth D' is inversely computed according to a fitting formula.

The alternating current field based quantitative evaluation method for metal surface cracks has the above step features, and various data fitting relations under the fixed lift-off $T_0$ and the arbitrary lift-off T are obtained through fitting. Then, a magnetic field signal under the unknown lift-off T' is compensated for through the attenuation coefficient, such that the corresponding crack length L' and the corresponding crack depth D' are inversely computed, and cracks on a surface of a structure under the nonmetallic coating under arbitrary unknown lift-off T' are accurately evaluated. The above specific steps may be summarized as follows: a distortion magnitude of a Bz signal under arbitrary height may be obtained by means of an attenuation coefficient; a crack length and a crack depth may be further evaluated by means of the distortion magnitude of the Bz signal; and arbitrary unknown lift-off is equivalently transformed into a traditional constant lift-off condition, and then the crack depth and the crack length are evaluated by means of a distortion magnitude of a Bx signal and the distortion magnitude of the Bz signal, respectively. Therefore, the alternating current field based quantitative evaluation method for metal surface cracks according to the disclosure improves data computation accuracy, meanwhile simplifies a computation flow, and solves an accurate evaluation problem of cracks under arbitrary lift-off.

In addition, the disclosure further provides a defect identification method and an array detection probe, which are based on an alternating current field. The solution provides an intuitive and visual identification method of lift-off jitter of an image, such that a defect on a surface of a structure can be accurately detected under lift-off jitter.

Figure 13:
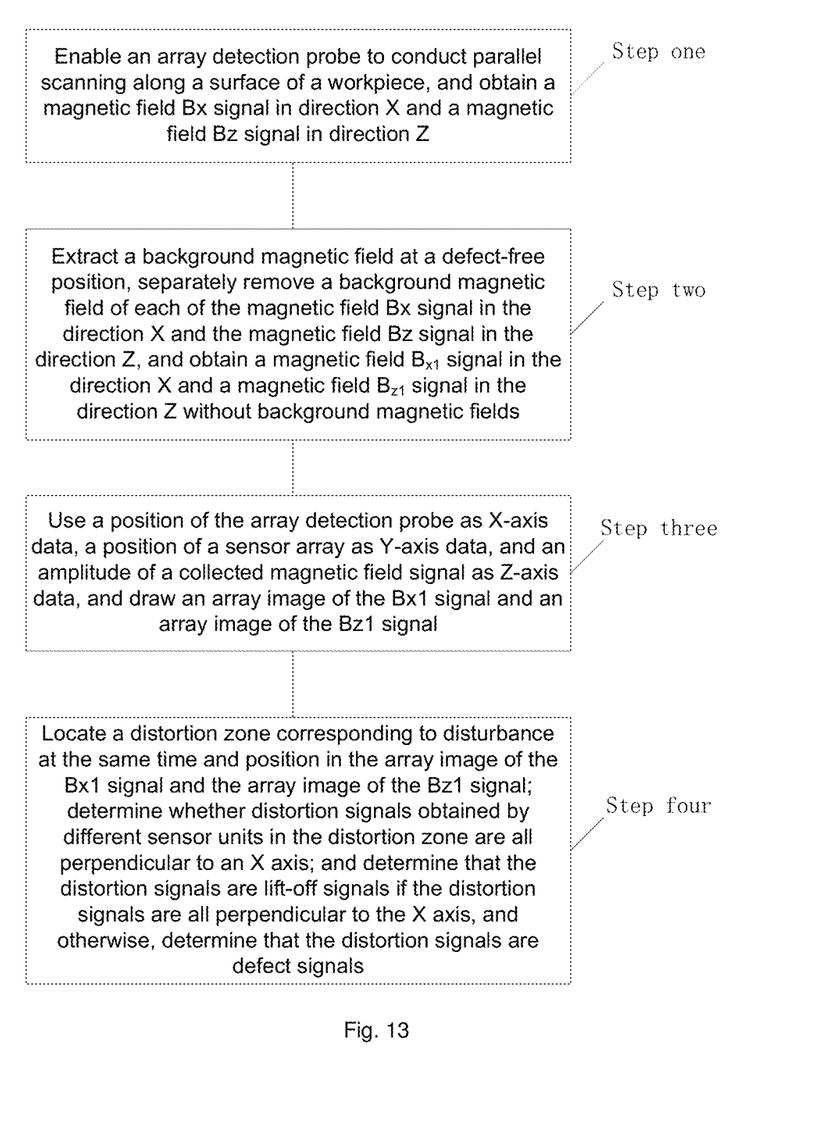
FIG. 13 is schematic flow diagram of an alternating current field based defect identification method according to the disclosure.
Figure 14:
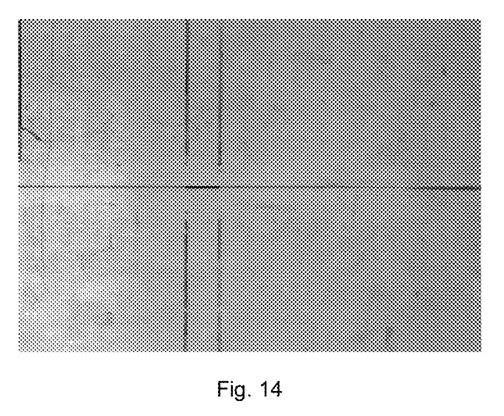
FIG. 14 is schematic structural diagram of a workpiece of parallel scanning in step one in an alternating current field based defect identification method.
Figure 15:
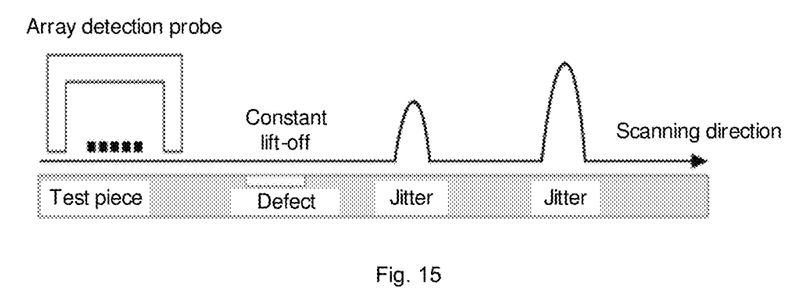
FIG. 15 is schematic diagram of an array detection probe during parallel scanning in step one in an alternating current field based defect identification method.

The disclosure provides an alternating current field based defect identification method. As shown in FIG. 13, the method specifically includes the following steps:

Step one: an array detection probe is enabled to conduct parallel scanning along a surface of a workpiece, and a magnetic field Bx signal in direction X and a magnetic field Bz signal in direction Z are obtained. Reference may be made to FIG. 14 for the workpiece subjected to parallel scanning. Reference may be made to FIG. 15 for a parallel scanning process of the array detection probe.

Step two: a background magnetic field at a defect-free position is extracted, a background magnetic field of each of the magnetic field Bx signal in the direction X and the magnetic field Bz signal in the direction Z is separately removed, and a magnetic field Bx1 signal in the direction X and a magnetic field Bz1 signal in the direction Z without background magnetic fields are obtained.

Figure 16:
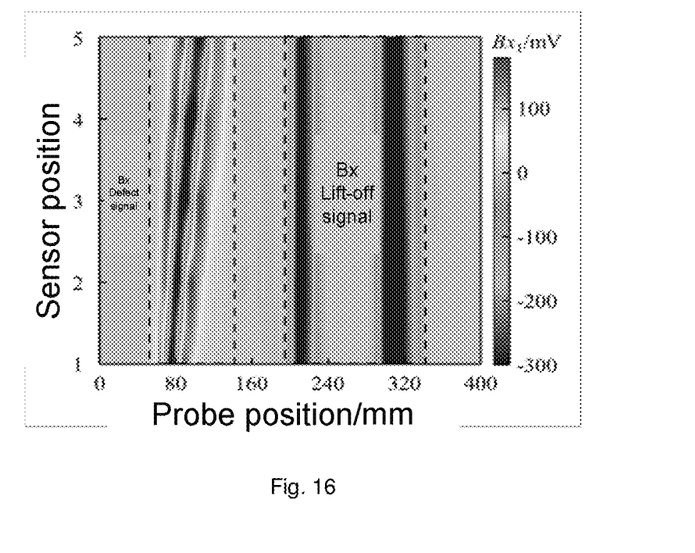
FIG. 16 is an array image of a Bx1 signal.
Figure 17:
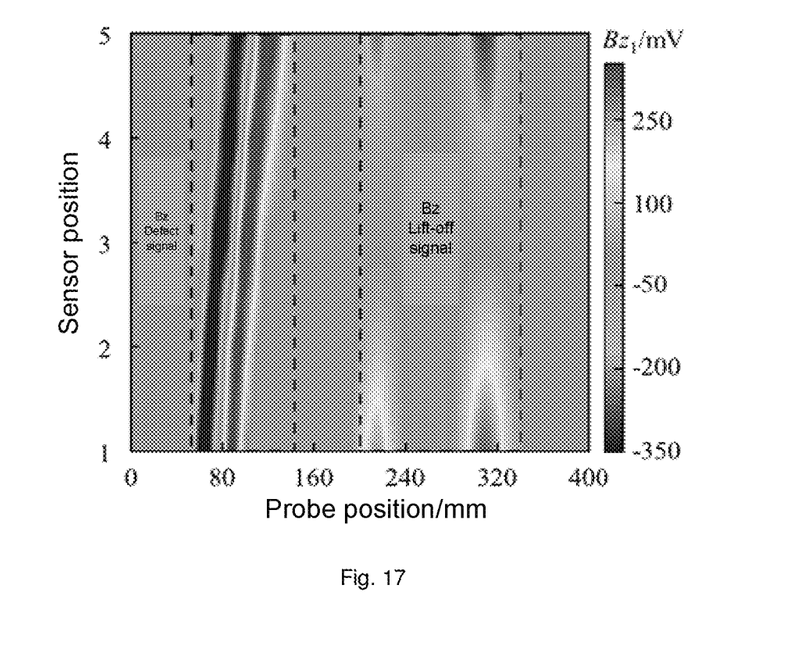
FIG. 17 is an array image of a Bz1 signal.

Step three: a position of the array detection probe, a position of a sensor array and an amplitude of a collected magnetic field signal are used as X-axis data, Y-axis data, and Z-axis data, respectively, and an array image of the Bx1 signal and an array image of the Bz1 signal are drawn. Reference may be made to FIGS. 16 and 17 for the array image of the Bx1 signal and the array image of the Bz1 signal.

Step four: a distortion zone corresponding to disturbance at the same time and position in the array image of the Bx1 signal and the array image of the Bz1 signal is located;

whether distortion signals obtained by different sensor units in the distortion zone are all perpendicular to an X axis is determined; and it is determined that the distortion signals are lift-off signals if the distortion signals are all perpendicular to the X axis, and otherwise, it is determined that the distortion signals are defect signals.

It should be noted that for the array image of the Bx1 signal and the array image of the Bz1 signal as shown in FIGS. 16 and 17, when the array detection probe passes a defect, different sensor units enter a defect zone at different moments and positions. For instance, if a sensor unit No.1 enters first and a sensor unit No.5 enters later, a defect signal may be in an inclined state. For the array image of the Bx1 signal and the array image of the Bz1 signal as shown in FIGS. 16 and 17, when probe lift-off interference occurs in the array detection probe, both the Bx1 signal and the Bz1 signal may be disturbed at the same time and the same position, which specifically has features consistent with features displayed in right zones of FIGS. 16 and 17.

Then, the distortion signals obtained by different sensor units in the distortion zone corresponding to the disturbance at the same time and position of the Bx1 signal and the Bz1 signal are further determined as follows: it is determined that the distortion signals are the lift-off signals if the distortion signals are all perpendicular to the X axis, and otherwise, it is determined that the distortion signals are the defect signals.

Specifically, reference is made to the array image of the Bx1 signal and the array image of the Bz1 signal as shown in FIGS. 16 and 17. The distortion signals obtained by different magnetic sensors in a first distortion zone from left to right of the figure form a certain angle with the X axis. Therefore, it is determined that the distortion signal is the defect signal. The distortion signals obtained by different magnetic sensors in a second distortion zone and a third distortion zone from left to right of the figure are perpendicular to the X axis. Therefore, it is determined that the distortion signal is the lift-off signal.

In this case, the whole defect identification process of an alternating current field based defect identification method according to the disclosure is completed. Compared with the prior art, the alternating current field based defect identification method according to the disclosure can effectively distinguish the defect signal from a lift-off interference signal of the detection probe, and the above discussion further proves how the defect identification method of the disclosure implements the whole accurate identification process of a defect under lift-off jitter of the detection probe.

Figure 7:
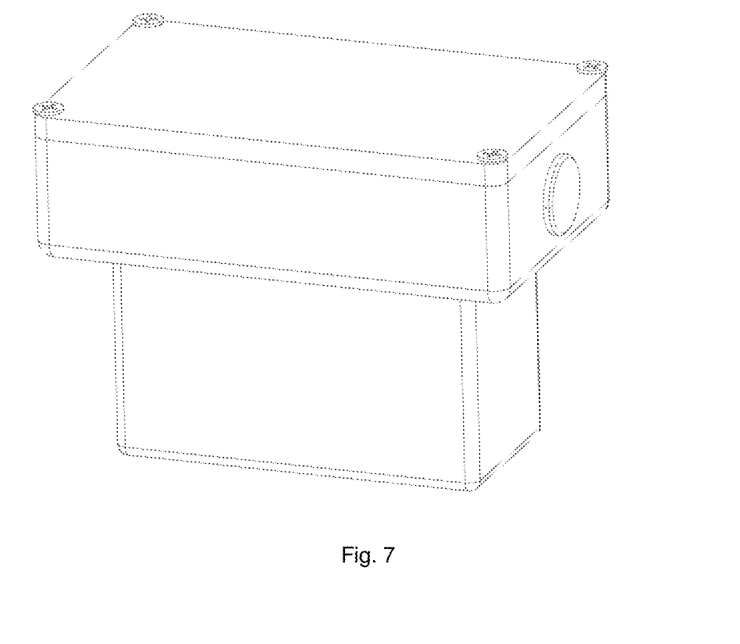
FIG. 7 is a schematic diagram of an overall structure of an alternating current field based array detection probe according to the disclosure.
Figure 8:
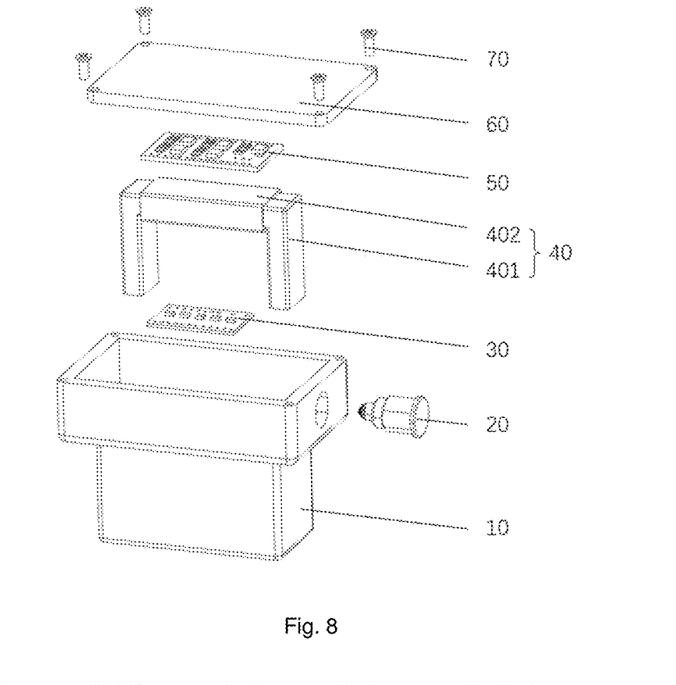
FIG. 8 is a schematic structural diagram of an exploded view of an alternating current field based array detection probe according to the disclosure.

In addition, as shown in FIGS. 7 and 8, the disclosure further provides an alternating current field based array detection probe. The array detection probe specifically includes: a probe housing, a lemo connector, a sensor array, an excitation device, and a signal conditioning circuit. The lemo connector is mounted on one side of the probe housing for signal transmission. The sensor array, the excitation device and the signal conditioning circuit are all mounted in the probe housing.

Figure 9:
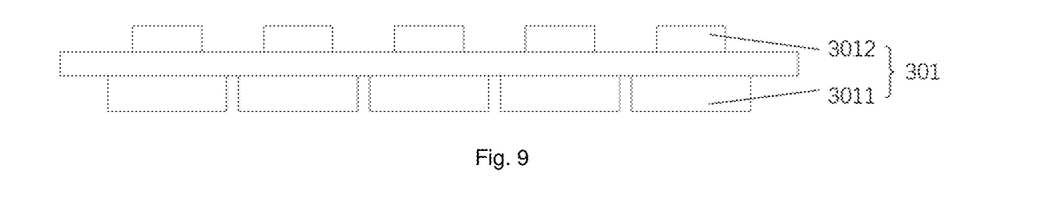
FIG. 9 is a schematic diagram of an overall structure of a sensor array in an array detection probe.
Figure 10:
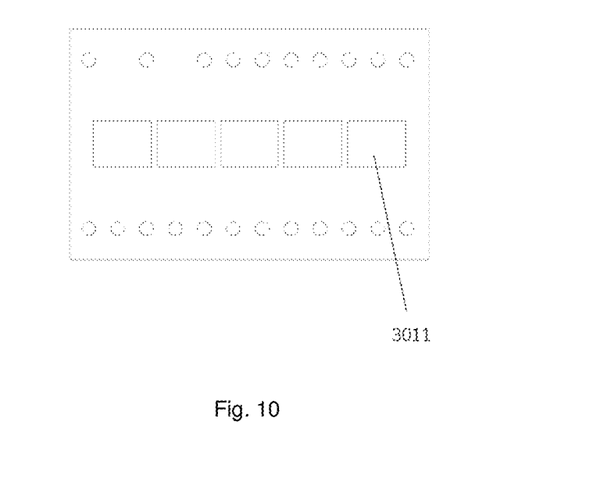
FIG. 10 is a bottom view of a sensor array in an array detection probe.
Figure 11:
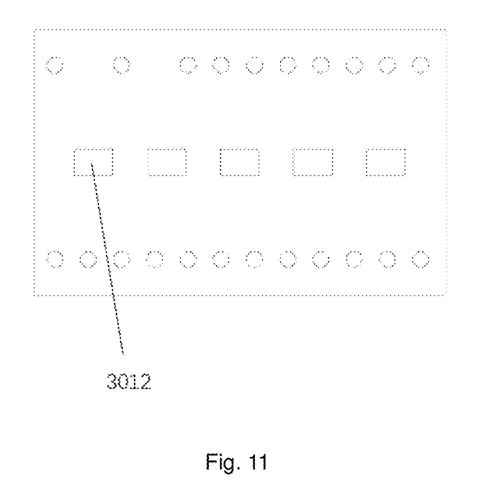
FIG. 11 is a top view of a sensor array in an array detection probe.

Further, as shown in FIG. 8, the excitation device includes an excitation coil and a U-shaped magnetic core. The excitation coil is uniformly wound around the U-shaped magnetic core and is configured to generate a uniform induced electromagnetic field on a surface of a workpiece to be tested. The sensor array is mounted directly below the excitation device, and includes n groups of sensor units, where n≥3. (As shown in FIG. 9, 10 or 11, five groups of sensor units are arranged in FIGS. 9, 10 and 11.) The sensor units are arranged between two legs on a lower portion of the U-shaped magnetic core, and are uniformly and equidistantly arranged in a cross beam direction of the U-shaped magnetic core. Each group of sensor units consists of a tunnel magnetoresistance (TMR) magnetic sensor having an X-axis sensitive direction and a TMR magnetic sensor having a Z-axis sensitive direction. The signal conditioning circuit is mounted above the excitation device and configured to amplify and filter a signal output by the sensor array.

Figure 12:
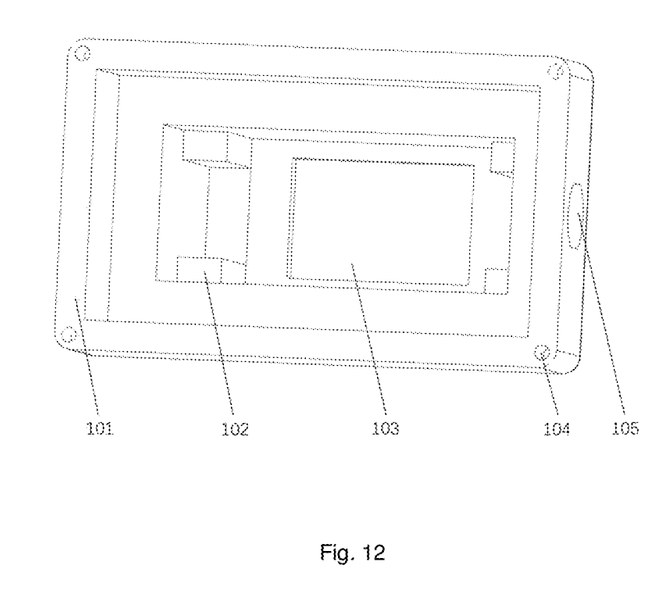
FIG. 12 is a schematic structural diagram of a probe housing in an array detection probe.

As a more preferred embodiment of the disclosure, in order to facilitate mounting and fixation of structural units such as the lemo connector, the sensor array, the excitation device, and the signal conditioning circuit, a specific structure of the probe housing is provided (a schematic diagram of which is as shown in FIG. 12). Specifically, the probe housing is provided with a side housing wall, a prismoid, a rectangular recess, a threaded hole, and a mounting hole. The prismoids are located at four corners of the side housing wall and configured to fixedly mount the excitation device. The rectangular recess is located on a bottom of the probe housing and is configured to mount the sensor array. Through the cooperation of the threaded hole and a fixing screw, a probe gland is further hermetically mounted at an opening of the probe housing. One side of the probe housing is further provided with the mounting hole. The mounting hole is configured to be in interference fit with the lemo connector.

Compared with a detection probe in the prior art, the alternating current field based array detection probe according to the disclosure arranges a plurality of sensor units in a scanning direction (each group of sensor units consists of a TMR magnetic sensor having an X-axis sensitive direction and a TMR magnetic sensor having a Z-axis sensitive direction), such that inspection structures detected by the sensor units may be mutually verified. In this way, a defect that the array detection probe in the prior art requires repeated scanning to improve a detection result (precision) is overcome, and detection efficiency of the detection probe is greatly improved.

The disclosure provides a defect identification method and an array detection probe, which are based on an alternating current field. The defect identification method includes the following steps: a magnetic field Bx signal in direction X and a magnetic field Bz signal in direction Z are obtained; a background magnetic field of each of the magnetic field Bx signal in the direction X and the magnetic field Bz signal in the direction Z is removed, and a magnetic field Bx1 signal in the direction X and a magnetic field Bz1 signal in the direction Z without background magnetic fields are obtained; an array image of the Bx1 signal and an array image of the Bz1 signal are drawn; and a distortion zone corresponding to disturbance at the same time and position in the array image of the Bx1 signal and the array image of the Bz1 signal is located. The alternating current field based defect identification method and array detection probe have above structural features, the obtained detection results are specifically verified by means of different sensor units, such that accuracy and detection efficiency of the detection results are significantly improved. Meanwhile, the magnetic field Bx signal in the direction X and the magnetic field Bz signal in the direction Z are obtained on the basis of the array detection probe. After interference of the background magnetic field of each signal is removed, jitter lift-off defect disturbance is accurately identified according to distortion signals obtained by different sensor units. In this way, an interference signal caused by non-defects is eliminated, and finally accuracy of the detection results is improved.

What are described above are merely specific embodiments of the disclosure, which are not intended to limit the protection scope of the disclosure. Any changes or substitutions that may be easily conceived by those skilled in the art within the technical scope disclosed in the disclosure are intended to fall within the protective scope of the disclosure. Therefore, the protective scope of the disclosure should be subject to the protective scope of the claims.

The invention claimed is:

1. An alternating current field based defect identification method, performed by an array detection probe, comprising the following steps:
   step one: enabling the array detection probe to conduct parallel scanning along a surface of a workpiece, and obtaining a magnetic field Bx signal in direction X and a magnetic field Bz signal in direction Z;
   step two: extracting a background magnetic field at a defect-free position of the workpiece, separately removing a background magnetic field of each of the magnetic field Bx signal in the direction X and the magnetic field Bz signal in the direction Z from the background magnetic field at the defect-free position, and obtaining a magnetic field Bx1 signal in the direction X and a magnetic field Bz1 signal in the direction Z without background magnetic fields;
   step three: using a position of the array detection probe as X-axis data, a position of a sensor array as Y-axis data, and an amplitude of a collected magnetic field signal as Z-axis data, and drawing an array image of the Bx1 signal and an array image of the Bz1 signal according to the magnetic field Bx1 signal in the direction X and the magnetic field Bz1 signal in the direction Z without background magnetic fields; and
   step four: locating a distortion zone corresponding to disturbance at the same time and position in the array image of the Bx1 signal and the array image of the Bz1 signal; determining whether distortion signals obtained by different sensor units of the sensor array in the distortion zone are all perpendicular to an X axis; and determining that the distortion signals are lift-off signals if the distortion signals are all perpendicular to the X axis, and otherwise, determining that the distortion signals are defect signals, wherein the array detection probe used in the defect identification method comprises: a probe housing, a lemo connector, the sensor array, an excitation device, and a signal conditioning circuit; the lemo connector is mounted on one side of the probe housing for signal transmission; the sensor array, the excitation device and the signal conditioning circuit are all mounted in the probe housing;
   the excitation device comprises an excitation coil and a U-shaped magnetic core, and the excitation coil is uniformly wound around the U-shaped magnetic core and is configured to generate a uniform induced electromagnetic field on a surface of a workpiece to be tested; the sensor array is mounted directly below the excitation device, and comprises n groups of sensor units, wherein n≥3; the sensor units are arranged between two legs on a lower portion of the U-shaped magnetic core, and are uniformly and equidistantly arranged in a cross beam direction of the U-shaped magnetic core; each group of sensor units consists of a tunnel magnetoresistance (TMR) magnetic sensor having an X-axis sensitive direction and a TMR magnetic sensor having a Z-axis sensitive direction; and the signal conditioning circuit is mounted above the excitation device and configured to amplify and filter a signal output by the sensor array.

2. The alternating current field based defect identification method according to claim 1, wherein the array detection probe used in the defect identification method further comprises: a probe gland configured to seal the probe housing; and
   the probe gland and the probe housing are fixedly connected into an integrated structure by means of a fixing screw.

* * * * *